United States Patent [19]

Collins et al.

[11] 4,427,267

[45] Jan. 24, 1984

[54] METAL DIPHTHALOCYANINE ELECTROCHROMIC DISPLAYS AND ELECTROLYTES THEREFOR

[75] Inventors: Gilbert C. Collins; David J. Schiffrin, both of Southampton, England

[73] Assignee: International Business Machines Corporation, Armonk, N.Y.

[21] Appl. No.: 307,915

[22] Filed: Oct. 2, 1981

[30] Foreign Application Priority Data

Dec. 19, 1980 [EP] European Pat. Off. ............ 80304653

[51] Int. Cl.³ .................................................. G02F 1/17
[52] U.S. Cl. .................................. 350/357; 252/408.1; 252/600
[58] Field of Search .............. 350/357; 252/600, 408.1

[56] References Cited

U.S. PATENT DOCUMENTS

| | | | |
|---|---|---|---|
| 3,708,220 | 1/1973 | Meyers et al. | 350/357 |
| 4,059,341 | 11/1977 | Zeller | 350/357 |
| 4,110,015 | 8/1978 | Reddy | 350/357 |
| 4,139,275 | 2/1979 | Yamo et al. | 350/357 |
| 4,184,751 | 1/1980 | Nicholson | 350/357 |
| 4,192,581 | 3/1980 | Yaguchi et al. | 350/357 |
| 4,210,390 | 7/1980 | Yaguchi | 350/357 |
| 4,306,774 | 12/1981 | Nicholson | 350/357 |
| 4,371,236 | 2/1983 | Nicholson | 252/600 |
| 4,376,569 | 3/1983 | Barltrop et al. | 350/357 |

FOREIGN PATENT DOCUMENTS

| | | | |
|---|---|---|---|
| 2756551 | 12/1977 | Fed. Rep. of Germany | 350/357 |
| 57-56823 | 4/1982 | Japan | 350/357 |
| 1356120 | 6/1976 | United Kingdom | 350/357 |
| 1535594 | 12/1978 | United Kingdom | 350/357 |

OTHER PUBLICATIONS

C.A., vol. 91, 166364a (1979).
Moskalev, P. N., et al., Opt. Spektrosk, vol. 29(2), pp. 414-415 (1970).
C.A., vol. 95, 105189h (1981), Citing Nicholson, M., et al., J. Electrochem. Soc., vol. 128(8), pp. 1740-1743 (1981).
"Effect of the Electrode Potential on the Absorption Spectrum of a Rare Earth Diphthalocyanine Layer," Optika I Spectroskopy vol. 29, p. 220, 1970.

*Primary Examiner*—Teddy S. Gron
*Attorney, Agent, or Firm*—Joseph E. Kieninger

[57] ABSTRACT

The lifetime of a metal diphthalocyanine electrochromic display can be substantially extended by employing a predominantly non-aqueous low hydroxyl ion electrolyte. A preferred electrolyte solvent is ethylene glycol and preferred conductivity salts are tetraethyl ammonium fluoride and sodium chloride. In the case of sodium chloride, conductivity is improved by the addition of up to 25% water to the electrolyte.

9 Claims, 10 Drawing Figures

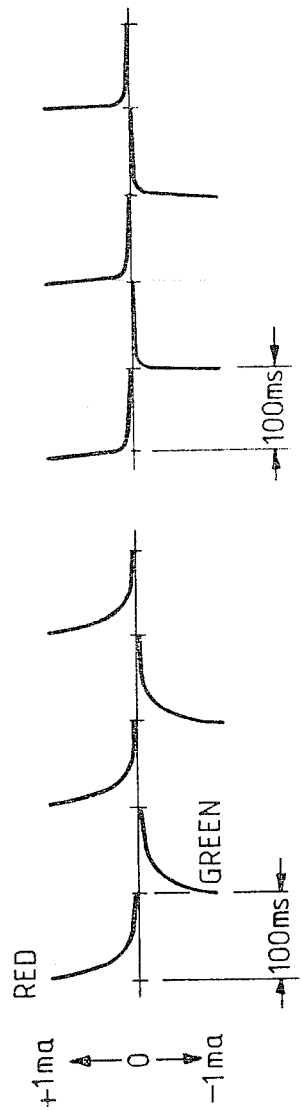
FIG. 3
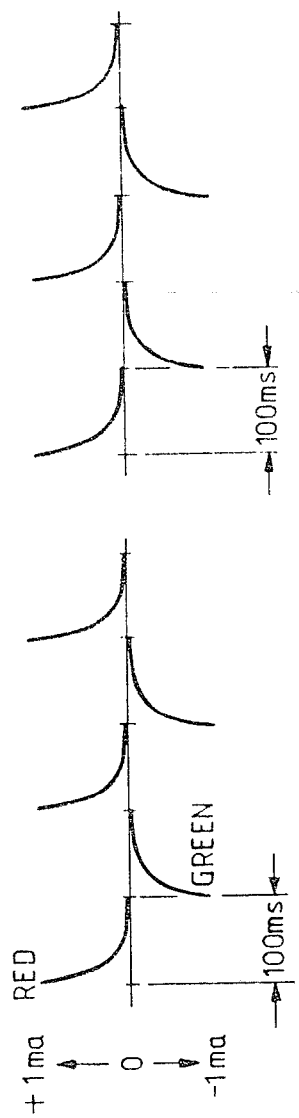
FIG. 4
FIG. 5
FIG. 6

METAL DIPHTHALOCYANINE ELECTROCHROMIC DISPLAYS AND ELECTROLYTES THEREFOR

DESCRIPTION

Technical Field

The invention relates to metal diphthalocyanine electrochromic displays and, in particular, to electrolytes in such displays.

BACKGROUND ART

Rare earth diphthalocyanines are organometallic complexes many of which are known to have electrochromic properties, i.e., their color changes in an applied electric field as a result of either oxidation or reduction of the molecule. Perhaps the best known of these substances is lutetium diphthalocyanine, whose chemical formula is commonly abbreviated to $LuH(Pc)_2$ where $Pc=[(C_{32}H_{16}N_8)^{2-}]$. A proposed structure of this substance is shown in FIG. 1 in which it can be seen that the lutetium atom is sandwiched between two large diphthalocyanine rings of the kind known as a macro cycle and the metal diphthalocyanine molecule itself is known as a macro cycle complex. The lutetium diphthalocyanine complex can take any charge state of $+2$ to $-1$. These charge states correspond to a wide range of colors: red ($+2$), green ($+1$), blue (0) and violet ($-1$). A distinct yellow-tan color is visible between the red and the green states. The singly positively charged (green) radical cation is the normal stable state and has an anion, the nature of which is not known, associated with it for charge neutrality.

Early studies of these properties are described in an article by P. N. Moskalev and I. S. Kirin entitled "Effect of the Electrode Potential on the Absorption Spectrum of a Rare Earth Diphthalocyanine Layer," (Optika I Spectroskopy Vol. 29, p. 220, 1970). This paper gives experimental results on the marked color changes of lutetium diphthalocyanine with applied potential in an electrolytic cell. In the experimental arrangement, the diphthalocyanine was coated over an electrode consisting of a transparent film of semiconductive tin oxide on a glass plate and placed in a 0.1 molar aqueous K Cl electrolyte. The potential of the electrode was varied relaive to a saturated calomel electrode and the resulting color changes observed. Other diphthalocyanines were also studied.

Published German patent application No. 2756551 (Rockwell International Corp.) describes various electrochromic display cells in which the electrochromism is provided by a metal diphthalocyanine layer. In an example, a lutetium diphthalocyanine layer is formed over tin oxide display electrodes deposited on a glass substrate. The film may be incorporated in a resin binder. The glass substrate is one wall of a sealed chamber in which counter and reference electrodes are also provided. The chamber is filled with plaster of paris for a reflective display and with a transparent gel for a transmissive display. The filler medium is saturated with aqueous potassium chloride as electrolyte, though other salts are also mentioned as possible alternatives.

It has been found that when such a lutetium diphthalocyanine display is cycled between different color states, the color intensity decreases gradually until it is no longer observable. In some cases, the film of lutetium diphthalocyanine even peels off the underlying electrode. The maximum number of cycles obtainable before such degradation takes place is less than 20–50,000.

Besides metal diphthalocyanines, several other solid film electrochromic materials are known. A great deal of work has been carried out on certain inorganic metal oxides, particularly tungsten and molybdenum oxides. These, too, are generally formed as layers over underlying display electrodes and color changes are brought about by the application of an electric potential between the display and a counter electrode through an electrolyte. A display employing these two substances is described in U.K. Pat. No. 1,356,120 which discusses, inter alia, the properties of the electrolyte which may be liquid or semi-solid (gels) and comprise dissolved acids or salts for conductivity. Sulfuric acid or salts of lithium are mentioned as suitable conductivity agents which are compatible with the tungsten oxide material and the counter electrodes. A preferred electrolyte is a gel of sulfuric acid in polyvinyl alcohol though other solvents such as water, glycerine and ethylene glycol are also mentioned.

It was later discovered that these types of electrolytes were unsuitable for tungsten oxide displays because of dissolution of the tungsten oxide and because of damage to the electrodes caused by hydrogen evolution which could take place at potentials not very different from those associated with the color change. Various subsequent patents (U.K. Pat. No. 1,535,594, U.K. published patent application 3,014,326, U.S. Pat. Nos. 4,110,015 and 4,139,275) suggest alternative organic solvents which are proton (hydrogen ion) free, do not have side reactions and do not lengthen switching time of the electrochromic films (i.e., the time taken to change color).

SUMMARY OF THE INVENTION

It is a primary object of this invention to provide an improved metal dithphalocyanine electrochromic display.

It is another object of this invention to provide a metal dithphalocyanine electrochromic display that is resistant to degradation.

It is still another object of this invention to provide a metal dithphalocyanine electrochromic display that is resistant to loss of color intensity.

It is yet still another object of this invention to provide a metal dithphalocyanine electrochromic display that has a lifetime of the order of a million cycles.

These and other objects are accomplished by a metal dithphalocyanine electrochromic display containing an electrolyte comprising a conductivity salt dissolved in a solvent which is predominantly non-aqueous and contains no other source of hydroxyl ions. Preferably, there is no water or at least no more than 25% water in the solvent. The preferred solvents are polyhydric alcohols, polyhydric ethers, glymes and mixtures thereof. The best of these is ethylene glycol which is surprising in that color switching times, as compared to aqueous solutions, are not markedly reduced. Surprisingly, up to 25% of water may be tolerated without adversely affecting the lifetime. The preferred conductivity salts are organic ionic halides, particularly tetraethyl ammonium fluoride which, unlike other fluorides, does not attack the glass of the cell. Sodium chloride is also a preferred conductivity salt and the conductivity of a sodium chloride electrolyte based on ethylene glycol may be significantly improved if up to 25% water is present by increasing the solubility of sodium chloride in the solvent.

The anions of these salts must be able to penetrate the diphthalocyanine film without disrupting it and the specific salts are chosen to give optimum conductivity and electrochemical reactivity, particularly in an ethylene glycol solvent. In potential step experiments employing non-aqueous solvents, a lutetium diphthalocyanine film has been cycled between its yellow/red and green states up to seven million times with no observable degradation or loss of color intensity. In a faster display arrangement employing potentiostatic bulk erasure to the yellow/tan state and selective constant current writing back to the rest potential green state, lifetimes of two million cycles have been achieved also without sign of degradation.

BRIEF DESCRIPTION OF THE DRAWINGS

FIG. 3 shows the variation of current with time at the start of a potential step cycle of the display cell of FIG. 2, filled with a molar $NH_4F$ aqueous electrolyte;

FIG. 4 shows the variation of current with time in the same cell as FIG. 3 after $10^5$ cycles;

FIG. 5 shows the variation of current with time at the start of a potential step cycle of the display cell of FIG. 2 filled with a non-aqueous electrolyte (molar $NH_4F$ in ethylene glycol) according to the invention;

FIG. 6 shows the variation of current with time in the same cell as FIG. 5 after $5 \times 10^6$ cycles;

DETAILED DESCRIPTION OF THE INVENTION

Figure 1:
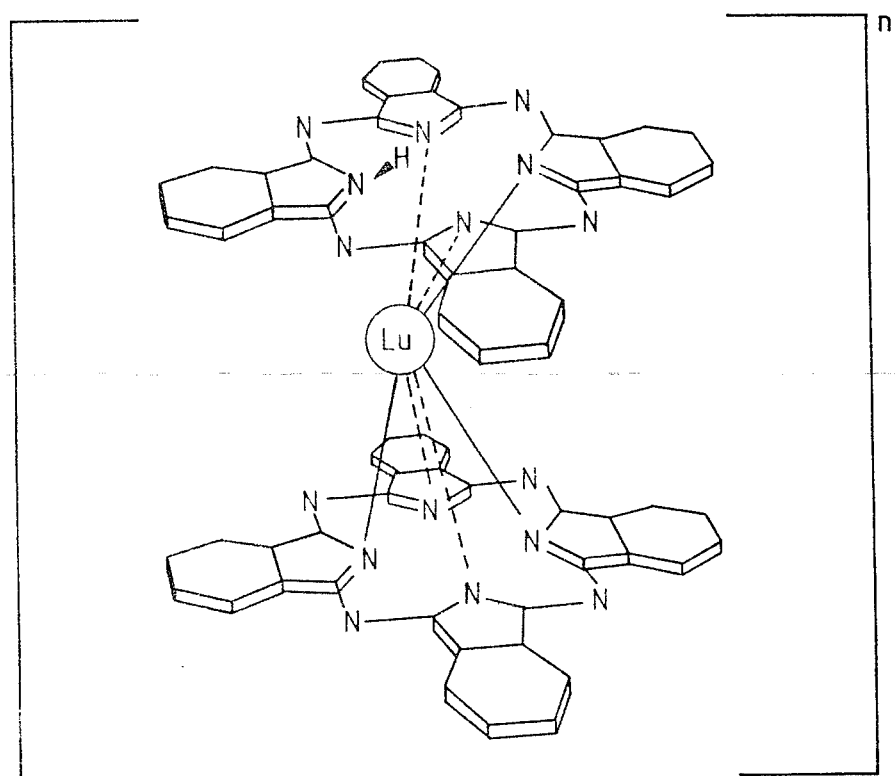
FIG. 1 shows on proposed structure of the lutetium diphthalocyanine complex.

A postulated structure for the lutetium diphthalocyanine complex is shown in FIG. 1. The lutetium atom is seen to be sandwiched between upper and lower phthalocyanine rings although the orientation of the two rings to each other is not necessarily as shown. Valency bonds to three nitrogen atoms are shown by solid lines and possible coordinating bonds to four further nitrogen atoms are shown by dotted lines. In the center of the upper phthalocyanine ring is shown an additional hydrogen atom. A small arrow head indicates a bonding of this hydrogen atom to the inner nitrogen atoms of the iso indole groups to form an imino group. In fact, this hydrogen atom appears to be substantially delocalized rather than associated with a specific one of the iso indole nitrogens.

The mechanism by which the lutetium diphthalocyanine complex is destroyed is not clear but it has been shown experimentally by electron spectroscopy chemical analysis that repeated electrolytic cycling in either an aqueous solution or 0.1 molar alkaline solution destroy the complex over a period of time. Firstly, the proportion of nitrogen decreases, indicating attack, probably at the imino nitrogens, by hydroxyl ions, and ultimately the lutetium disappears, indicating that it has been released and has passed into solution. Simple immersion in an aqueous solution does not affect the film.

Lutetium diphthalocyanine for use in an experimental display cell in accordance with the invention was prepared by two alternative methods. In the first method, 4.6 gm of lutetium acetate mixed with 12.9 gm of 1,2 dicyanobenzene was slowing heated to 200° C. for three hours in an open container. The reaction mixture was allowed to cool to room temperature and the solid product was washed with acetic anhydride, acetone and dimethyl formamide before drying. The lutetium diphthalocyanine so produced was further purified by sublimation.

In the second method, 0.978 gm of lutetium acetate was refluxed with 9 gm of 1,2 dicyanobenzene for two hours and, after cooling, refluxed for a further 30 minutes in 1-pentanol. This solution was filtered at around 80° C. to collect crude lutetium diphthalocyanine. The crude product was washed four times in n-ethanol and dried overnight at around 90° C.

To further purify the product, it was refluxed in 50 ml of acetic anhydride for one hour, left to cool for three hours and then filtered and washed with acetone. This process was repeated with successively, 50 ml acetone and 25 ml dimethyl formamide before finally washing in 5 ml dimethyl formamide (twice) and 25 mls acetone. The product was dried over night at 90° C. and finally for two hours at 110° C.

Figure 2:
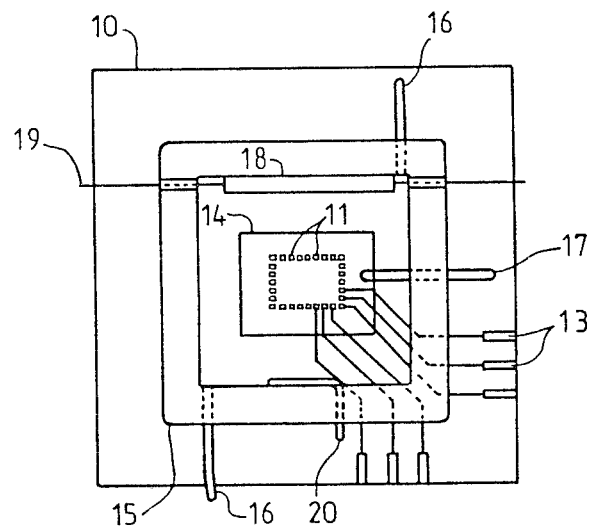
FIG. 2 shows an experimental display cell having display electrodes coated with lutetium diphthalocyanine.

An experimental display cell of the type in which the properties of lutetium diphthalocyanine films, prepared by the above methods, were investigated as shown in plan in FIG. 2. The cell comprises a glass substrate on which a metallic pattern of display electrodes 11, conductor lines 12 and pads 13 is formed. Only some of lines 12 and pads 13 are shown in the interests of clarity. The metallurgy consists of successively evaporated titanium (500 Å) and platinum (2000 Å) which is defined by means of a photoresist masking and lift-off technique. To simplify the connection metallurgy only a box ring of electrodes is formed which are isolated from each other. Clearly, other more complex patterns could be formed or a complete matrix of electrodes used, through the latter would require multi-level connectors.

To provide a relatively smooth surface and prevent contact with the conductor lines a further layer of photoresist is spin-coated over the metallurgy, exposed through a mask and developed to expose the metal surfaces of display electrodes 11 and connector pads 13. A 2000 Å film 14 of lutetium diphthalocyanine, prepared by one of the above methods is next evaporated over the area of electrodes 11. The resistivity characteristics of this film means that it is not necessary to isolate the portion of the film on an electrode from that on adjacent electrodes. However, such isolation may be effected by means of suitable masking techniques, if desired.

The top and sides of the cell are formed by a single acrylic moulding 15 which, for experimental reasons is removably clamped to the substrate 10 between copper platens. The cell top is spaced from the underlying substrate by a silicone rubber O-ring seal which cannot be seen in FIG. 2. Of course, the cell top would be permanently bonded to the substrate in a display cell which did not have to be dismantled.

The cell top has let into its sides filler tubes 16 for introducing a liquid electrolyte and a thermocouple 17. A platinum black rod 18 functions as the counter electrode of the display and is supported by wires 19 passing through the cell side wall. Finally, a stiff wire reference electrode 20 is also provided through the cell side wall. This electrode is of silver or copper depending upon the electrolyte used.

In order to display information in the cell of FIG. 2, when filled with an electrolyte, an appropriate potential must be applied between the counter electrode 18 and the selected display electrodes 11. At zero potential difference, the lutetium diphthalocyanine film on electrodes 11 is green but as the potential difference is altered the electrode film changes color, as discussed above.

Two techniques for altering this potential difference are useful in display applications and both have been employed with the cell of FIG. 2. One of these is the potentiostatic method in which a potentiostat is employed to force current through the cell to keep the reference electrode 19 at a predetermined potential with respect to the display electrodes. In this case a varying current flows through the cell to maintain this potential.

The other technique is to employ constant current (galvanostatic) driving in which a constant current is forced through the cell for a predetermined time. The variation in potential of the display electrodes under constant current conditions may be monitored by means of the reference electrode 19.

In conducting experiments on the cell of FIG. 2, both a potentiostat and a galvanostat were employed whose potential and current, respectively, could be varied and whose output could be switched on and off for variable periods in accordance with the demands of the experiment. Micro-processor control of these quantities as well as the duration of the write, hold, erase and off times was employed so that the cell could be driven through any desired cycle repeatedly. The cycles used may be defined by four successive phases: Write, Hold, Erase and Off. Both the Hold and Off states are simply periods when no potential is applied across the cell. In all experiments, only a single one of the display electrodes 11 was cycled. The area of each of these electrodes was 0.01562 cm².

The results of a series of potentiostatic step experiments are illustrated in FIGS. 3 to 6. In these experiments, a cell as shown in FIG. 2 was firstly filled with an aqueous solution of molar ammonium fluoride (NH$_4$F). The potential step cycle employed was as follows:

| WRITE | potentiostatic OV for 100 mS; |
|---|---|
| HOLD | O s; |
| ERASE | potentiostatic, +700 mV for 100 mS; |
| OFF | O s; |

In this cycle the red/tan color of the film is regarded as the erased state and is produced by application of the potential of +700 mV. In the written state, the color is green. In the potentiostatic arrangement employed, the reference electrode potential is controlled with respect to the display electrodes, the counter electrode being grounded.

FIG. 3 shows the observed variation of current with potential step at the start of the experiment after 100 cycles. The gentle curves indicate the gradual charging of the film of lutetium phthalocyanine between its red/tan state (doubly positively charged) and the green state (singly positively charged).

FIG. 4 shows the current variation after $10^5$ cycles. The abrupt fall in current observed indicates that there is very little of the film left as lutetium diphthalocyanine. Visual observation of the color showed that it faded progressively until scarcely visible after $10^5$ cycles.

That the film had indeed broken down was confirmed by the ESCA technique which indicated reduced amount of nitrogen and very little lutetium left on the electrodes.

A similar cell was filled with a molar solution of ammonium fluoride in ethylene glycol to constitute a display according to the invention. FIGS. 5 and 6 show the potential step current variation after 100 and after $5 \times 10^6$ cycles respectively. With the new electrolyte, no degradation of color or other effect on the electrochromic film was observed although some etching of the glass of the cell was noticed. From a practical display aspect, the write time of 100 mS is rather long.

Similar comparative experiments have demonstrated the benefits of the invention with other conductivity salts in ethylene glycol also. Sodium chloride, lithium chloride, tetraethyl ammonium chloride and tetraethyl ammonium fluoride have all been used and up to $7 \times 10^6$ reversals achieved without degradation over periods of up to four months. None of these etched the cell glass.

Figure 7:
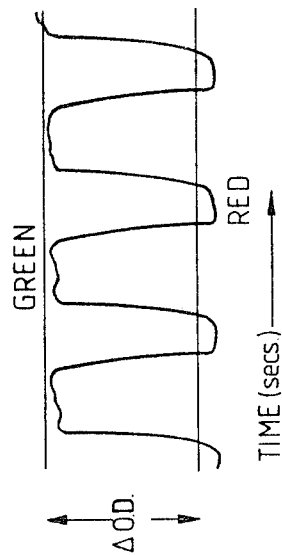
FIG. 7 shows the variation of optical density with time of the lutetium diphthalocyanine film of the cell of FIG. 2 at the start of an alternate potentiostatic/galvanostatic step cycle, when the cell is filled with a molar NaCl aqueous electrolyte.
Figure 8:
FIG. 8 shows the optical density variation with time in the same cell as FIG. 7 after $10^4$ cycles.

In order to try to obtain faster switching or, at least, writing times, a series of galvanostatic (constant current) experiments was conducted in both aqueous and ethylene glycol electrolytes. The results are illustrated in FIGS. 7 to 10. In the experiments of FIGS. 7 and 8, a cell like that of FIG. 2 was filled with a solution of 1 M NaCl in water as the electrolyte. The written state in this case was considered to be the red and was produced by anodic constant current driving. The erased state was the green and the film was returned to this state potentiostatically. The cycle employed was:

| WRITE | galvanostatic, +6 mA for 3 mS; |
|---|---|
| HOLD | 300 mS; |
| ERASE | +150 mV for 300 mS; |
| OFF | 300 mS; |

FIG. 7 shows the variation of optical density of the film at the start of density this cycling, as measured by means of a spectra spotmeter. FIG. 8 shows the optical density after only $10^4$ cycles. Total failure of the electrochromic is apparent.

When the electrolyte was replaced with an ethylene glycol/1 M NaCl electrolyte the electrochromic film showed no sign of degradation up to $3 \times 10^4$ cycles. However, the potentials reached during the galvanostatic anodic write were such that the platinum display electrode began to dissolve partially.

The cycle was then changed so that the red/tan state was regarded as the erased state and was produced potentiostatically and the green written state was written cathodically at constant current. The new cycle was:

| ERASE | potentiostatic, +700 mV for 50 mS; |
|---|---|
| OFF | 50 mS; |

| | |
|---|---|
| WRITE | galvanostatic, −1.2 mA for 10 mS; |
| HOLD | 50 mS. |

Figure 9:
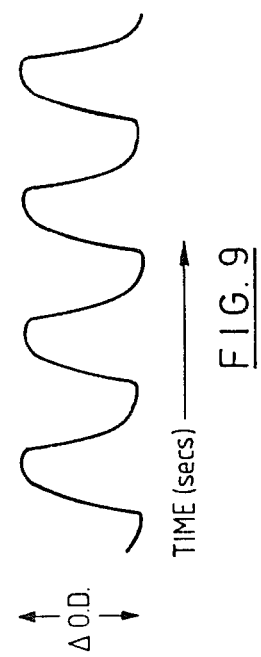
FIG. 9 shows the variation in optical density with time after $2 \times 10^6$ cycles of the same step cycle as FIGS. 7 and 8 when the cell is filled with a non-aqueous electrolyte (molar NaCl in ethylene glycol) according to the invention.

Providing the temperature was above 20° C. (below this temperature some hydrogen evolution from the platinum electrode corners occurred), this cycle proved satisfactory. With the same ethylene glycol/1 molar NaCl electrolyte as before over $2 \times 10^6$ cycles have been achieved without any sign of either the lutetium diphthalocyanine film or the platinum electrodes being affected. FIG. 9 shows the optical density variation after $2 \times 10^6$ reversals. This is substantially the same as at the start of the experiment.

Figure 10:
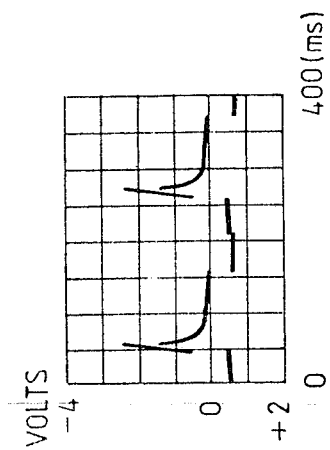
FIG. 10 shows the potential transients also after $2 \times 10^6$ cycles of the same step cycle and for the same cell as FIG. 9.

FIG. 10 shows the potential transients observed after $2 \times 10^6$ cycles and these, too, are substantially the same as at the start of the experiment. The total cathodic potential excursions, including the IR potential drop between the reference electrode and the film, do not exceed −2500 mV below which corrosion does not appear to occur. The charge density employed in this cycle to change the color state of the film between red/tan and green and vice versa was calculated to be $\leq 0.77$ mC cm$^{-2}$.

In selecting a suitable non-aqueous and low hydroxyl ion electrolyte for displays according to the invention, the following factors must be considered in choosing both the solvent and the conductivity salt: (1) The solvent should not dissolve the electrochromic film; (2) It should be a good solvent for the chosen conductivity salts which are ionic halides for reasons given below; (3) The dielectric constant should be high to prevent ion pairing which would otherwise reduce the conductivity of the solution; (4) There should be low reactivity with the species generated during the redox reaction; and (5) The solvent should have low viscosity to avoid slowing ion transport and the writing process due to increased resistivity.

Dielectric constants and viscosity of several well known solvents are given in the following table:

TABLE 1

| Substance | Dielectric Constant at 30° C. | Viscosity (centipoise) | Comment |
|---|---|---|---|
| Methanol | — | 0.5 (30° C.) | Dissolves LuH(Pc)$_2$ |
| Ethanol | — | 1.0 (30° C.) | Dissolves LuH(Pc)$_2$ |
| Formamide | 109 | 3.3 (25° C.) | Dissolves LuH(Pc)$_2$ |
| Formic acid | 58 | 1.47 (30° C.) | Usually aqueous |
| Maleic anhydride | 50 | — | Forms maleic acid with water |
| Glycerol | 42 | 629 (30° C.) | Inert, but very viscous |
| Furfural | 42 | — | Poor stability |
| Acetamide | 39 | — | Dissolves LuH(Pc)$_2$ |
| Ethylene glycol | 38 | 19.9 (20° C.) | Inert, but good properties |

From this table it can be seen that ethylene glycol is the best choice although glycerol could be used if a slow writing process were acceptable. Thus, polyhydric alcohols appear to be the most suitable solvents. Based on the known properties of the other solvents it is also predicted that certain polyethers and glymes would also be suitable.

As to the choice of conductivity salt, these must be sufficiently soluble in the chosen solvents to give as high a conductivity as possible. High conductivity is desirable to limit the IR drop across the cell and thus reduce the potentially damaging cathodic excursions during cathodic galvanostatic driving. The salt chosen must not react with components of the cell and must not disrupt the electrochromic film. In the case of lutetium diphthalocyanine, it is found that if the anions of the salt are large, they tend to fracture the film during the anodic part of the cycle. For this reason, only ionic halides, specifically chlorides and fluorides, appear to be suitable.

The following table gives the results of display cycling experiments for various ethylene glycol based electrolytes with several different conductivity salts. As indicated, in some cases a proportion of water was added to the ethylene glycol. By way of comparison, the conductivity of a 1 molar aqueous NaCl solution at 20° C. is around $10^{-1}$ ohm$^{-1}$cm$^{-1}$.

Where the number of cycles is indicated as greater than a certain number, this means that no degradation of color or of LuH(Pc)$_2$ film had been observed after the number of cycles shown but simply that the experiment had been terminated for reasons of time or for reasons unconnected with the LuH(Pc)$_2$.

TABLE 2

| Conductivity Salt (in ethylene glycol unless stated) | Conc M | Conductivity ohm$^1$cm$^1$ 20° C. | Conductivity ohm$^1$cm$^1$ 40° C. | No of cycles Pot. | No of cycles Galv. | COMMENTS |
|---|---|---|---|---|---|---|
| NaCl | 1 | $4.6 \times 10^{-3}$ | $9.4 \times 10^{-3}$ | $>6 \times 10^6$ | $>2 \times 10^6$ | No LuH(Pc)$_2$ degradation but tendency to dissolve Pt in galvanostatic mode at high current density write. +1 |
| NaCl (25% aqueous) | 1 | $1.5 \times 10^{-2}$ | $2.4 \times 10^{-2}$ | $>5 \times 10^6$ | — | No degradation of LuH(Pc)$_2$ |
| NaCl (25% aqueous) | 2 | $1.8 \times 10^{-2}$ | $2.8 \times 10^{-2}$ | $>5 \times 10^6$ | — | As above |
| NaCl (50% aqueous) | 1 | $3.2 \times 10^{-2}$ | $5.1 \times 10^{-2}$ | $4 \times 10^5$ | — | LuH(Pc)$_2$ film loses red colour and/or fractures |
| LiCl | 3.5 | $5.5 \times 10^{-3}$ | $1.4 \times 10^{-2}$ | $>5 \times 10^5$ | $>2 \times 10^4$ | High current needed galvanostatically |
| (C$_2$H$_5$)$_4$NCl | 3.5 | $1.3 \times 10^{-2}$ | $2.4 \times 10^{-2}$ | $>1 \times 10^6$ | $>2 \times 10^5$ | No degradation of LuH(Pc)$_2$. Tendency of Pt to blacken and dissolve from edge at high current densities on writing. +1 |
| NH$_4$F | 1 | $4 \times 10^{-3}$ | $8 \times 10^{-3}$ | $>5 \times 10^6$ | — | No Lu(H)Pc$_2$ film degradation |

TABLE 2-continued

| Conductivity Salt (in ethylene glycol unless stated) | Conc M | Conductivity ohm$^{-1}$cm$^{-1}$ 20° C. | 40° C. | No of cycles Pot. | Galv. | COMMENTS |
|---|---|---|---|---|---|---|
| (C$_2$H$_5$)$_4$NF | 2 | 6.9 × 10$^{-3}$ | 1.3 × 10$^{-2}$ | >7 × 10$^6$ | 3 × 10$^5$ | glass of cell was partly etched. No LuH(Pc)$_2$ degradation but Pt delaminated in galvanostatic mode due to faulty processing. +1 |

In the aforesaid table, the potentiostatic step cycle was between 700 mV and OV at 0.5 second intervals without hold or erase periods. The galvanostatic cycle was 3 mA for 5 mS (1.2 mA for 10 mS for NaCl) followed by a potentiostatic erase.

The conductivities attainable are limited in some cases, sodium chloride particularly, by the solubility of the salt in the solvent. This could however be increased substantially by the addition of up to 25% of water to the ethylene glycol without deleterious effect in potentiostatic cycling.

Other salts such as lithium chloride although more soluble did not show increased conductivity with increased concentration. Tetra ethyl ammonium fluoride, (C$_2$H$_5$)$_4$NF, is soluble at higher concentrations than shown and offers the highest conductivity per mole dissolved. Also, unlike other fluorides it does not appear to attack the glass of the cell.

Conductivity also increases with temperature for all the salts shown. The optimum temperature range is 30°–40° C. This temperature range also reduces the tendency of platinum to dissolve when chlorides are used as the conductivity salt.

When chlorides were employed, silver reference electrodes were used in the above experiments. However, when fluorides were employed it was necessary to change the reference electrode to copper.

The above discussed experiments were conducted entirely with electrochromic films of lutetium diphthalocyanine. However, it is predicted that the invention would be of benefit with other known electrochromic metal diphthalocyanines such as tin, all the lanthanides plus scandium and yttrium and also the stable non radioactive actinides because of the stabilization of the electrically generated radical species in the solid state by the use of the non-aqueous solvents disclosed. It is also considered that the invention would be of benefit with any substituted or modified diphthalocyanines which are electrochromic.

The detailed description of the invention will now be concluded with two preferred examples of electrochromic displays according to the invention.

EXAMPLE 1

A display cell as described in connection with FIG. 2, have lutetium diphthalocyanine coated display electrodes, was filled with an electrolyte of the following composition:

| Ethylene glycol | <100% |
|---|---|
| Water | trace |
| NaCl | 1M |

The cell was driven according to the following cycle for 2 × 10$^6$ cycles:

| WRITE | Galvanostatic, 1.2 mA, 10 mS; |
|---|---|
| HOLD | 50 ms; |
| ERASE | Potentiostatic, +700 mV, 50 mS; |
| OFF | 50 ms. |

The temperature during this period was maintained at 20±5° C.

At the end of this time, no degradation of the color or structure of the film could be observed. No platinum dissolution had occurred.

EXAMPLE 2

A display cell as described in connection with FIG. 2 having lutetium diphthalocyanine coated display electrodes was filled with an electrolyte of the following composition:

| Ethylene glycol | 75% |
|---|---|
| Water | 25% |
| NaCl | 1M |

The cell was subjected to a 700 mV/OV potentiostatic step cycle of 500 mS intervals for 5 × 10$^6$ cycles. No visible degradation of the film occurred.

EXAMPLE 3

A display cell as described in connection with FIG. 2, having lutetium diphthalocyanine coated display electrodes, was filled with an electrolyte comprising 2 molar tetraethyl ammonium fluoride dissolved in ethylene glycol.

The cell was driven according to the following cycle for 3 × 10$^5$ cycles:

| WRITE | Galvanostatic, 4 mA, 1 mS; |
|---|---|
| HOLD | 500 ms; |
| ERASE | Potentiostatic, +600 mV, 50 mS; |
| OFF | 500 mS. |

The temperature during this period was maintained at 20+5° C.

At the end of the period no degradation of the color or structure of the LuH(Pc)$_2$ film could be observed, but there was some delamination of the platinum from the underlying glass substrate due to faulty processing during cell manufacture.

Although a preferred embodiment of this invention has been described, it is understood that numerous variations may be made in accordance with the principles of this invention:

What is claimed is:
1. An electrochromic display device comprising
a counter electrode,
at least one display electrode in spaced relation to said counter electrode,
a layer of an electrochromic metal diphthalocyanine on said display electrode, a solvent taken from the group consisting of a polyhydric alcohol, a polyhydric ether, a glyme and mixtures thereof in contact with said layer, and a conductivity salt dissolved in said solvent to form an electrolyte in electrical contact with said counter electrode and said display electrode that enables said layer to be cycled between different colored states for an extended time period.

2. A device as described in claim 1 wherein said solvent contains up to 25% by weight of water.

3. A device as claimed in claim 1 wherein said solvent is substantially free of hydroxyl ions.

4. A device as claimed in claim 1 wherein said solvent is ethylene glycol.

5. A device as claimed in claim 4 in which said salt is sodium chloride.

6. A device as claimed in claim 4 wherein said salt is tetraethylammonium chloride.

7. A device as claimed in claim 1 wherein said salt is taken from the group consisting of organic ionic chlorides and organic ionic fluorides.

8. A device as claimed in claim 1 in which said diphthalocyanine is lutetium diphthalocyanine.

9. A device as claimed in claim 1 wherein said display electrode is platinum.

* * * * *